United States Patent [19]
Neal
[11] 4,045,708
[45] Aug. 30, 1977

[54] DISCHARGE LAMP BALLAST CIRCUIT

[75] Inventor: Wayne R. Neal, Hendersonville, N.C.
[73] Assignee: General Electric Company, New York, N.Y.

[21] Appl. No.: 608,531
[22] Filed: Aug. 28, 1975
[51] Int. Cl.[2] ...................... H05B 41/16; H02M 5/06; H02M 5/20
[52] U.S. Cl. .................................... 315/171; 315/174; 315/205; 315/276; 315/283; 315/DIG. 5; 363/68; 363/126
[58] Field of Search ............... 315/145, 147, 194, 206, 315/205, 207, 265, 282, 278, 241 P, 241 R, 163, 166, 171, 174, 175, 176, 177, 276, 283; 321/15, 47

[56] References Cited

U.S. PATENT DOCUMENTS

| | | | |
|---|---|---|---|
| 2,777,973 | 1/1957 | Steele et al. | 315/205 |
| 3,034,015 | 5/1962 | Schultz | 315/205 |
| 3,253,184 | 5/1966 | Willecke et al. | 315/176 |
| 3,427,501 | 2/1969 | Laub et al. | 315/241 R |
| 3,735,238 | 5/1973 | Miller | 315/241 P |
| 3,758,815 | 9/1973 | Paget | 315/176 |
| 3,805,112 | 4/1974 | Tsumura | 315/241 P |

*Primary Examiner*—Eugene La Roche
*Attorney, Agent, or Firm*—Sidney Greenberg

[57] ABSTRACT

Electrical ballast circuit for operating gaseous discharge lamps with direct current. An inductive reactor coil connected to an alternating current source is connected to a discharge lamp via a full-wave rectifier, and an auxiliary induction coil inductively coupled to the reactor coil is connected to the discharge lamp via another full-wave rectifier, resulting in the currents from the respective rectifiers to the lamp being out of phase with one another, thereby raising the average current through the lamp and the voltage across the lamp to prevent lamp de-ionization and reduce lamp re-ignition voltage. Series connected capacitors may be incorporated in the circuit to increase the starting voltage on the lamp if necessary.

11 Claims, 6 Drawing Figures

DISCHARGE LAMP BALLAST CIRCUIT

The present invention relates to discharge lamp operating circuits, and more particularly concerns direct current ballast circuits for such lamps.

It is a general object of the invention to provide an improved direct current operating circuit for loads, especially gaseous discharge lamps.

It is a particular object of the invention to provide an improved direct current ballast circuit for gaseous discharge lamps which avoids lamp de-energization due to de-ionization of the lamp during operation, and reduces lamp re-ignition voltage.

Another object of the invention is to provide a direct current circuit of the above type which produces relatively high voltage for starting the discharge lamp.

Still another object of the invention is to provide a direct current operating circuit having relatively low current ripple characteristics.

Other objects and advantages will become apparent from the following description and the appended claims.

With the above objects in view, the present invention in one of its aspects relates to an electrical operating circuit comprising, in combination, a source of alternating current, current limiting reactance means comprising a first induction coil connected to the source of alternating current, an auxiliary induction coil inductively coupled to the first induction coil, first rectifier means connected to the output of the first induction coil, second rectifier means connected to the output of the auxiliary induction coil, and load means connected to the first and second rectifier means.

In a typical embodiment of the invention, the load means is a high intensity gaseous discharge lamp, the first induction coil serves as a ballast reactance for the lamp, and each of the rectifier means is a full wave bridge rectifier.

The invention will be better understood from the following description taken in conjunction with the accompanying drawings, in which.

Figure 1:
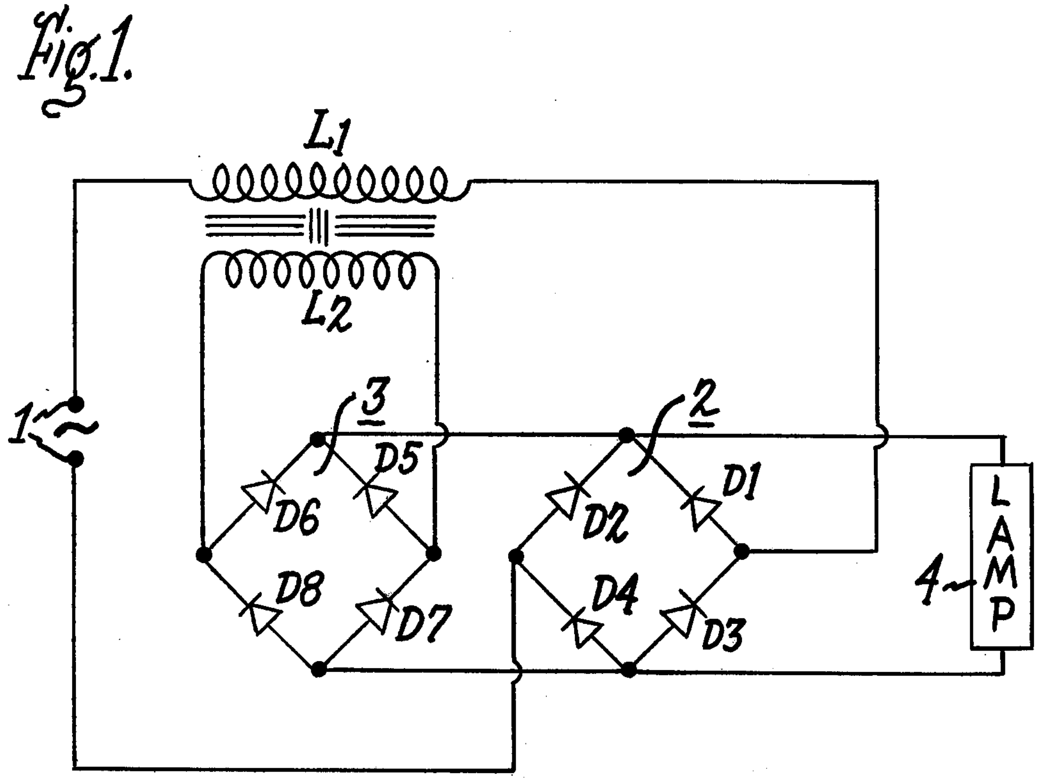
FIG. 1 is a circuit diagram of a direct current operating circuit for a gaseous discharge lamp in accordance with an embodiment of the invention.

Referring now to the drawings, and particularly to FIG. 1, there is shown a circuit diagram of a typical embodiment of the invention comprising terminals 1 of a source of alternating current, and induction coil $L_1$ connected at one side to one of the source terminals and at the other side to an input terminal of full wave bridge rectifier 2, which comprises diodes D1, D2, D3 and D4 arranged in conventional manner as shown, the other input terminal of bridge rectifier 2 being connected to the other source terminal 1. Auxiliary induction coil $L_2$ is inductively coupled to main induction coil $L_1$, such as by arrangement of the two coils on a common magnetic core on opposite sides of a magnetic shunt. Such an arrangement of inductively coupled coils is shown, for example, in the patent to Willis, U.S. Pat. No. 3,873,910, assigned to the same assignee as the present invention, and the disclosure thereof is accordingly incorporated herein by reference. Auxiliary induction coil $L_2$ is connected at opposite sides respectively to the input terminals of another full wave bridge rectifier 3 similar to bridge rectifier 2 and comprising diodes D5, D6, D7 and D8. The output terminals of bridge rectifier 3 are connected to the output terminals of bridge rectifier 2 which in turn are connected across lamp load 4. Lamp 4 is typically a high intensity gaseous discharge lamp, such as a mercury vapor lamp, metal halide lamp or a high pressure sodium vapor lamp. Due to this arrangement, the direct current supplied to lamp 4 by main induction coil $L_1$ via bridge rectifier 2 is substantially out of phase with the direct current supplied to the lamp by auxiliary coil $L_2$ via bridge rectifier 3. As a result, the average current through the lamp and the voltage across the lamp is substantially increased over the average magnitude of current and voltage which would be applied in the absence of auxiliary coil $L_2$ and its associated rectifier circuit, and therefore the tendency of the lamp to drop out because of de-ionization at current zero is largely prevented, and at the same time the lamp re-ignition voltage is substantially reduced so that starting of the lamp is facilitated. As will be understood, the phase shift provided by the described circuit is achieved by the approximate 180° phase shift occurring in coil $L_2$ with respect to coil $L_1$ due to the described inductive coupling, combined with the approximate 90° lead in current of the output of coil $L_2$ due to the voltage across $L_1$ leading the current through $L_1$. The resultant phase shift caused by the operation of both coil circuits thus is approximately 90° at lamp starting. After the lamp has started, the degree of phase shift is somewhat reduced from 90°.

In a typical case, the turns ratio of coils $L_1$ and $L_2$ is about 1:1, but this ratio may be about 1:4 or 1:5 to provide for increased line power factor where desired.

Figure 5:
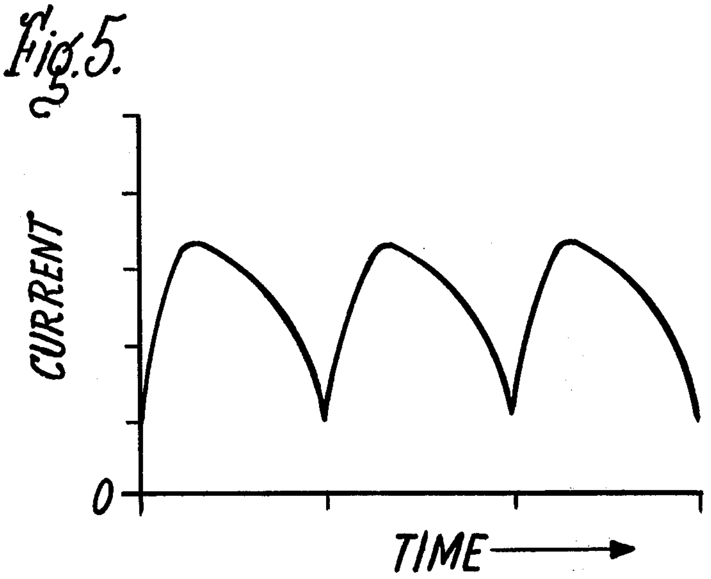
FIG. 5 is a diagram of the lamp operating current wave form characterizing the output of the circuits of FIGS. 1–4.

FIG. 5 illustrates a typical current wave form characteristic of the lamp current during lamp operation. As will be seen, the minimum points of the wave form are raised substantially above current zero, thereby avoiding lamp de-ionization during the operation of lamp with the unfavorable results therefrom as previously described.

Figure 2:
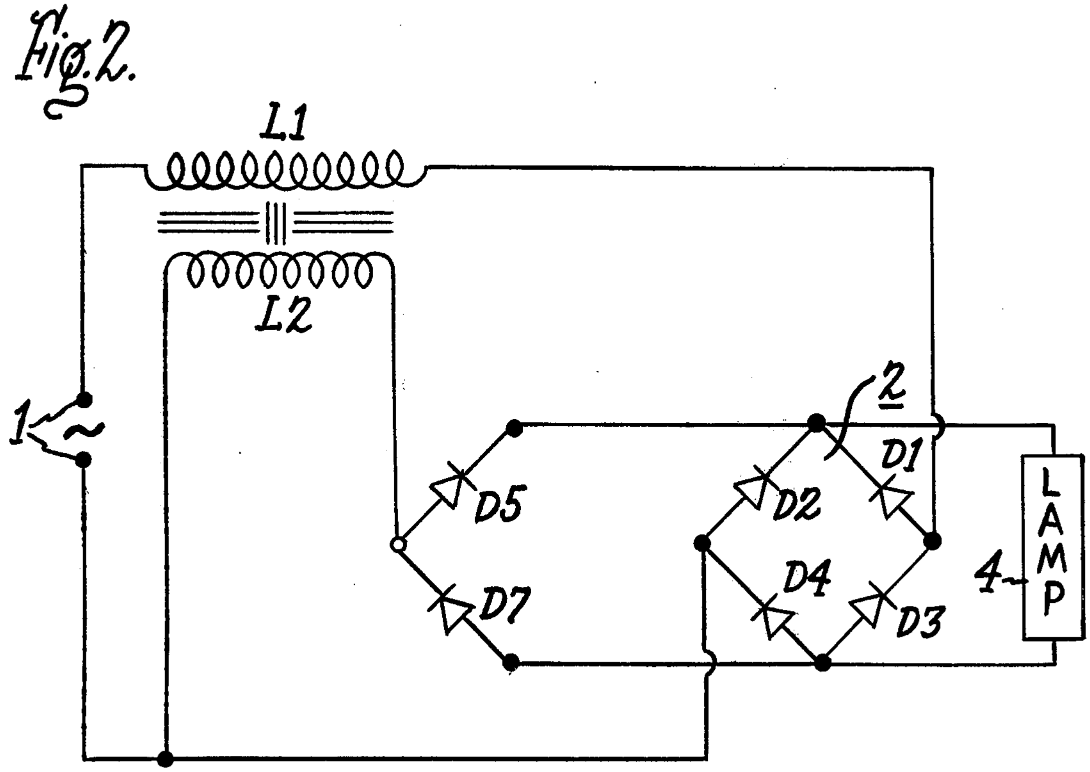
FIG. 2 is a circuit diagram of a modification of the FIG. 1 circuit.
Figure 3:
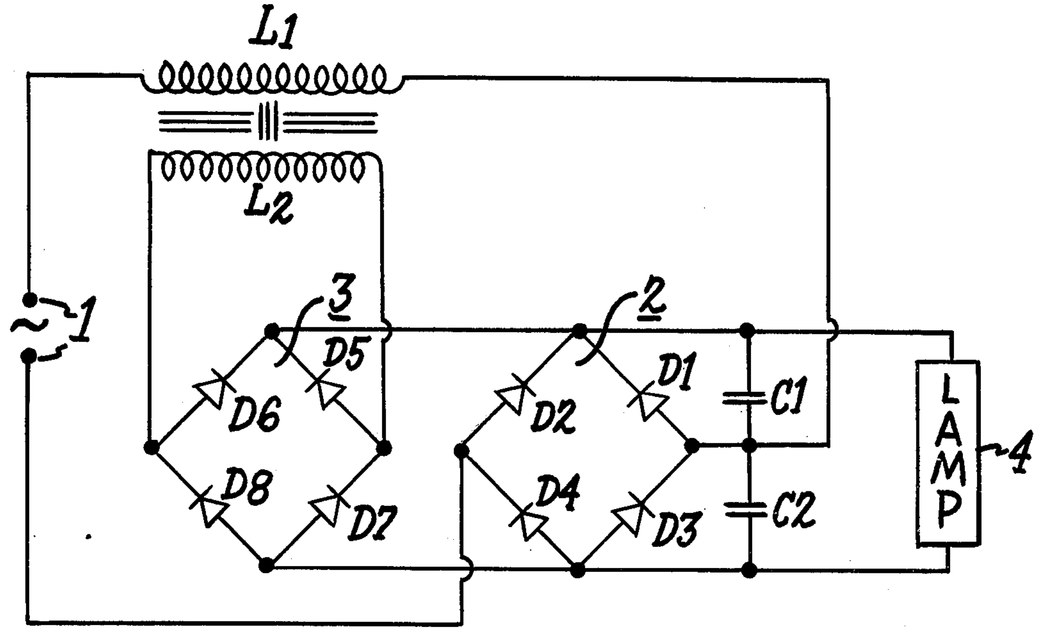
FIG. 3 is a circuit diagram similar to the FIG. 1 circuit incorporating a voltage doubler circuit.

FIG. 2 shows a modification of the FIG. 1 circuit wherein diodes D6 and D8 of bridge rectifier 3 are omitted and the lead from coil $L_2$ is connected to the supply line as shown. Diodes D5 and D7 remain connected in the circuit such that they conduct on alternate half-cycles to provide uniform polarity with respect to the polarity of the output terminals of bridge rectifier 2 to which they are respectively connected. In this version, diodes D2 and D4 of bridge rectifier 2 co-act also with diodes D5 and D7 to provide full wave rectification of the current from auxiliary coil $L_2$.

Where necessary or desirable the described circuits may be modified to provide for substantially increased lamp starting voltage. FIG. 3 illustrates a circuit similar to the FIG. 1 circuit in which voltage doubler means comprising capacitors C1 and C2 are connected in series across bridge rectifier 2. As shown, induction coil $L_1$ is connected to the junction of capacitors C1 and C2 as well as to the junction of diodes D1 and D3. As a result, the starting voltage applied to lamp 4 is approximately double that applied in the absence of capacitors C1 and C2. In addition to producing increased starting voltage, capacitors C1 and C2 serve as a filter network for making the current ripple shown in FIG. 5 less pronounced, especially when capacitors of relatively large magnitude are selected.

Figure 4:
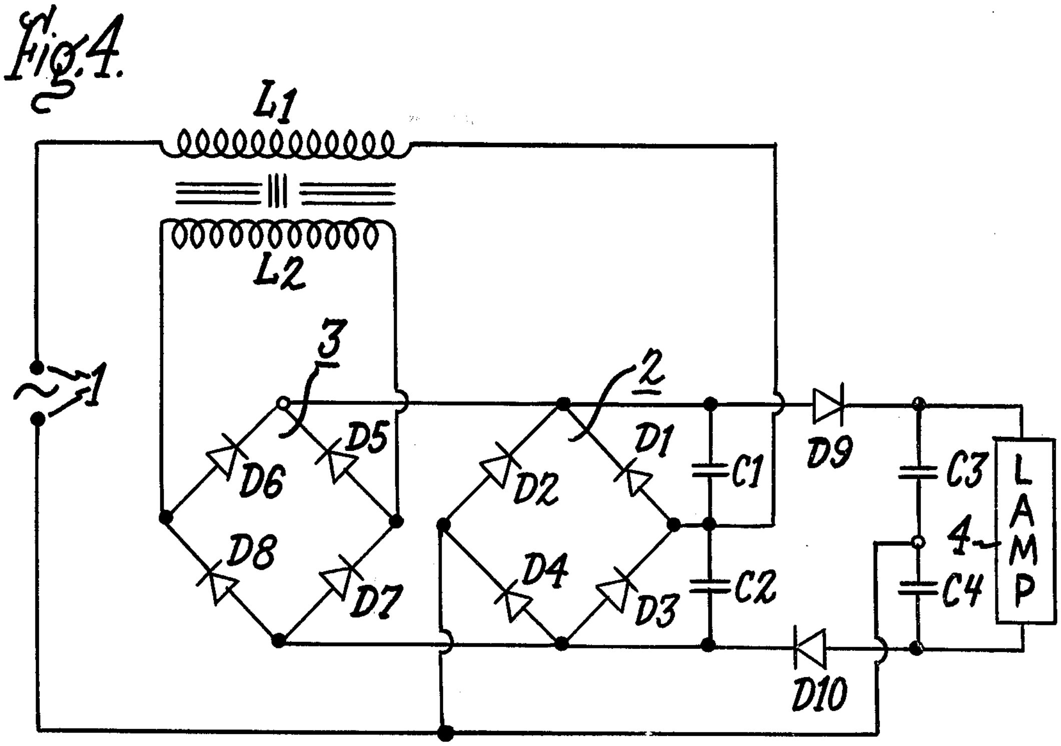
FIG. 4 is a circuit diagram similar to the FIG. 3 circuit incorporating a voltage quadrupler circuit.

FIG. 4 shows a further modification of the described circuit incorporating a voltage quadrupler network for use where even higher lamp starting voltages are necessary. In addition to capacitors C1 and C2 arranged as previously described, diode D9 is connected between the positive output terminal of bridge rectifier 2 and lamp 4, diode D10 is connected between the negative output terminal of bridge rectifier 2 and lamp 4, and capacitors C3 and C4 are connected in series across the lamp with the supply line connected to the junction thereof. Diodes D9 and D10 are oppositely poled as shown, so that diode D9 charges capacitor C3 when the output of bridge 2 is positive, while diode D10 conducts and charges capacitor C4. As a result, an approximately four-fold increase in lamp starting voltage is obtained, as compared to that produced by the circuits of FIGS. 1 and 2.

Figure 6:
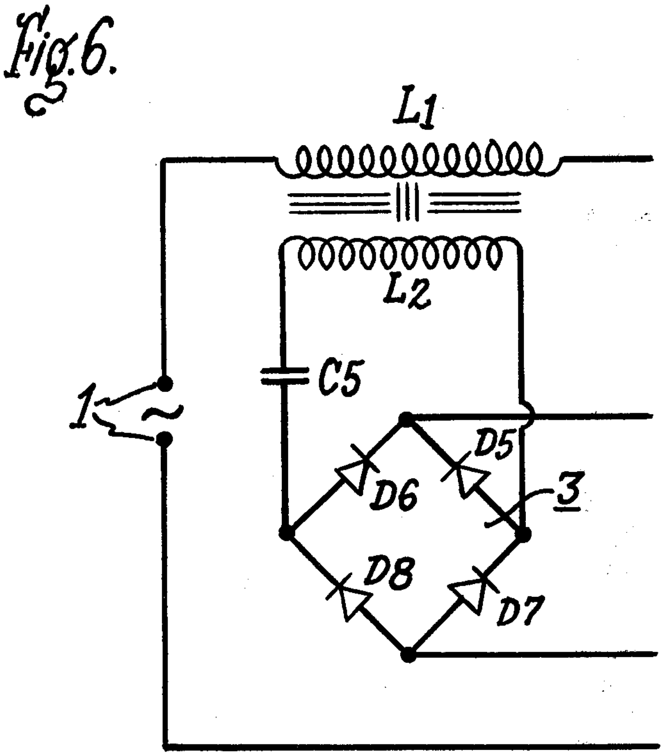
FIG. 6 shows a portion of the FIG. 1 circuit depicting a modification thereof.

FIG. 6 shows a modification of the described circuits in which capacitor C5 is connected between auxiliary induction coil $L_2$ and the input terminal of bridge rectifier 3. Capacitor C5 may be selected in conjunction with the leakage reactance existing between induction coils $L_1$ and $L_2$ to saturate the magnetic core associated therewith, so as to provide a high degree of lamp watt regulation for a wide range of input voltage and also to provide a power factor of over 90%.

While the invention has been described primarily in its application to high intensity discharge lamps, it may also be found useful as a direct current power supply for other loads where substantial filtering of the current is necessary or desirable.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Electrical operating circuit comprising, in combination, a source of alternating current, current limiting reactance means comprising a first induction coil connected to said source of alternating current for applying alternating current to said first induction coil, an auxiliary induction coil inductively coupled to said first induction coil, first full wave rectifier means connected to the output of said first induction coil, said first induction coil being connected in series between said source of alternating current and said first rectifier means, second full wave rectifier means connected to the output of said auxiliary induction coil, and load means connected to the combined outputs of said first and second rectifier means.

2. A circuit as defined in claim 1, said first and second rectifier means each comprising a full wave bridge rectifier.

3. A circuit as defined in claim 1, said first rectifier means comprising a first full wave bridge rectifier, said second rectifier means comprising oppositely poled rectifiers connected to each other across said full wave bridge rectifier and forming with a portion of the latter rectifier a second full wave rectifier.

4. A circuit as defined in claim 1, and capacitance means connected between said auxiliary induction coil and said second rectifier means for regulation of load power and improvement of power factor thereof.

5. A circuit as defined in claim 1, the output current of said first rectifier means being substantially out of phase with the output current of said second rectifier means.

6. A circuit as defined in claim 1, said load means comprising a gaseous discharge lamp.

7. A circuit as defined in claim 6, the load operating current produced by the circuit being direct current having a minimum magnitude substantially higher than zero current for preventing de-ionization of said lamp.

8. A circuit as defined in claim 1, and voltage multiplying means connected across said load for increasing the starting voltage applied thereto.

9. A circuit as defined in claim 8, said voltage multiplying means comprising a voltage doubler circuit.

10. A circuit as defined in claim 8, said voltage multiplying means comprising a voltage quadrupler circuit.

11. A circuit as defined in claim 10, said voltage quadrupler circuit comprising first and second capacitors connected in series across said first rectifier means, the junction of said capacitors connected to the input of said first rectifier means and to said first induction coil, third and fourth capacitors connected in series across said load, the junction of said third and fourth capacitors connected to said alternating current source, and a pair of oppositely poled rectifiers connected between said series connected third and fourth capacitors and the output of said first rectifier means.

* * * * *